(12) United States Patent
Wang et al.

(10) Patent No.: US 10,815,111 B2
(45) Date of Patent: Oct. 27, 2020

(54) SIDE SHUTOFF PISTON VALVE ASSEMBLY

(71) Applicant: The Procter & Gamble Company, Cincinnati, OH (US)

(72) Inventors: Xin Wang, Beijing (CN); Ritsuo Kumagai, Takasaki (JP)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

(21) Appl. No.: 16/123,152

(22) Filed: Sep. 6, 2018

(65) Prior Publication Data
US 2019/0077648 A1 Mar. 14, 2019

(51) Int. Cl.
| | |
|---|---|
| *B67C 3/26* | (2006.01) |
| *F16K 3/24* | (2006.01) |
| *F16K 23/00* | (2006.01) |
| *B65B 39/00* | (2006.01) |
| *B65B 3/12* | (2006.01) |
| *B67C 3/28* | (2006.01) |
| *F16K 31/122* | (2006.01) |
| *B67C 3/12* | (2006.01) |
| *F16K 39/02* | (2006.01) |

(52) U.S. Cl.
CPC ............. *B67C 3/2608* (2013.01); *B65B 3/12* (2013.01); *B65B 39/005* (2013.01); *B67C 3/286* (2013.01); *F16K 3/24* (2013.01); *F16K 23/00* (2013.01); *F16K 31/122* (2013.01); *B65B 2039/009* (2013.01); *B67C 3/12* (2013.01); *B67C 3/2614* (2013.01); *F16K 39/024* (2013.01)

(58) Field of Classification Search
CPC .......... B65B 39/004; B65B 3/12; B65B 3/32; B65B 39/005; B67C 3/206; B67C 3/2608
See application file for complete search history.

(56) References Cited

U.S. PATENT DOCUMENTS

| | | | | |
|---|---|---|---|---|
| 2,854,170 | A * | 9/1958 | Borgardt | B65B 3/32 222/1 |
| 3,850,345 | A * | 11/1974 | Merritt | B65B 3/323 222/168.5 |
| 4,037,996 | A * | 7/1977 | Loliger | F04B 5/00 417/518 |
| 4,363,429 | A | 12/1982 | Schindler | |
| 4,967,931 | A | 11/1990 | DeVries | |
| 5,137,187 | A | 8/1992 | Nichols et al. | |
| 5,992,687 | A * | 11/1999 | Hinds | B65B 3/12 222/1 |
| 6,119,905 | A * | 9/2000 | Cocchi | A23G 9/283 222/509 |
| 6,299,025 | B1 * | 10/2001 | Watanabe | A23G 9/22 222/146.6 |
| 6,299,134 | B1 | 10/2001 | Laaja | |
| 6,484,745 | B1 * | 11/2002 | Navarro | B65B 39/004 137/15.05 |

(Continued)

FOREIGN PATENT DOCUMENTS

EP 2708491 B1 7/2016

OTHER PUBLICATIONS

PCT Search Report for application PCT/CN2017/101011, dated Jun. 7, 2018, 11 pages.

*Primary Examiner* — Timothy P. Kelly
(74) *Attorney, Agent, or Firm* — Andres E. Velarde

(57) ABSTRACT

A side shutoff piston valve assembly for filling containers with liquids while reducing or eliminating splash-back and dripping of the liquids.

10 Claims, 8 Drawing Sheets

(56) References Cited

U.S. PATENT DOCUMENTS

| | | |
|---|---|---|
| 7,011,117 B1 | 3/2006 | Carpino et al. |
| 8,191,576 B2 | 6/2012 | Himmelmann |
| 9,720,425 B2 | 8/2017 | Goudy et al. |
| 2011/0186757 A1 | 8/2011 | Kawamura et al. |
| 2017/0015452 A1 | 1/2017 | Heuser |

* cited by examiner

SIDE SHUTOFF PISTON VALVE ASSEMBLY

FIELD OF THE INVENTION

This disclosure is directed to an improved liquid valve assembly, and more particularly to a side shutoff piston valve assembly that can be used for filling containers with liquids at high rates of speed.

BACKGROUND OF THE INVENTION

High speed liquid filling systems are well known and used in many different industries. In many of the systems, liquids are filled into containers through a series of pumps, pressurized tanks and flow meters and/or valves to help ensure the correct amount of liquid is dispensed into the containers.

When filling containers, especially at high rates under pressure, however, conventional pumps, pressurized or gravity fed systems and valves can create a surge of liquid (the so-called "water hammer" or "hydraulic shock") at the start and end of the filling cycle that can cause the liquid in the container to splash back (i.e., in a direction opposite to the direction of filling) and often out of the container being filled. This can lead to a waste of the fluid, contamination of the outer surfaces of the container and/or contamination of the filling equipment itself.

Conventional approaches for addressing the splash-back issue have focused either on increasing the container head space (i.e., to prevent any back-splash from existing the container) or improving designs of the filling nozzle tip (e.g., dimensions, through-hole diameters, and the like). Although helpful for mitigating the splash-back issues, such approaches are nevertheless limited and may adversely affect either the consumer experience or production cost.

Accordingly, it would be desirable to provide an improved fluid filling system, and especially a liquid valve assembly that can be used for filling pressurized liquids while significantly reducing or eliminating liquid splash-back.

Further, when the filling cycle ends and the liquid flow is shut off, there may still be a small amount of liquid at the tip of the filling nozzle (resulting in the so-called wet nozzle tip), which may accumulate and result in dripping and contamination during massive production.

It will also be advantageous to provide an improved fluid filling system, and especially a liquid valve assembly with reduced dripping.

SUMMARY OF THE INVENTION

The present invention provides a liquid valve assembly with a side shutoff piston valve, which is design to control or modulate the liquid filling flow rate at the beginning and end of the filling cycle in a specific pattern so as to significantly reduce or eliminate splashing, and preferably also reducing dripping.

One aspect of the present invention relates to a liquid valve assembly containing:
  (a) a liquid chamber having a first end, a second end that is opposite to the first end, and at least one sidewall extending between the first and second ends;
  (b) a liquid inlet orifice located on the at least one sidewall of the liquid chamber, wherein the liquid inlet orifice is in fluid communication with a source of a liquid;
  (c) a liquid outlet orifice located at the first end of the liquid chamber, wherein the liquid outlet orifice is in fluid communication with a container to be filled with the liquid; and
  (d) a piston valve disposed inside the liquid chamber, wherein the piston valve is movable between a first position, a second position and a third position, wherein at the first position said piston valve blocks both the liquid outlet orifice and the liquid inlet orifice, wherein at the second position the piston valve does not block the liquid outlet orifice but blocks the liquid inlet orifice, and wherein at the third position said piston valve does not block either the liquid outlet orifice or the liquid inlet orifice.

Another aspect of the present invention relates to use of the above-mentioned liquid valve assembly for filling a liquid detergent composition.

These and other aspects of the present invention will become more apparent upon reading the following detailed description of the invention.

DETAILED DESCRIPTION OF THE INVENTION

Figure 1:
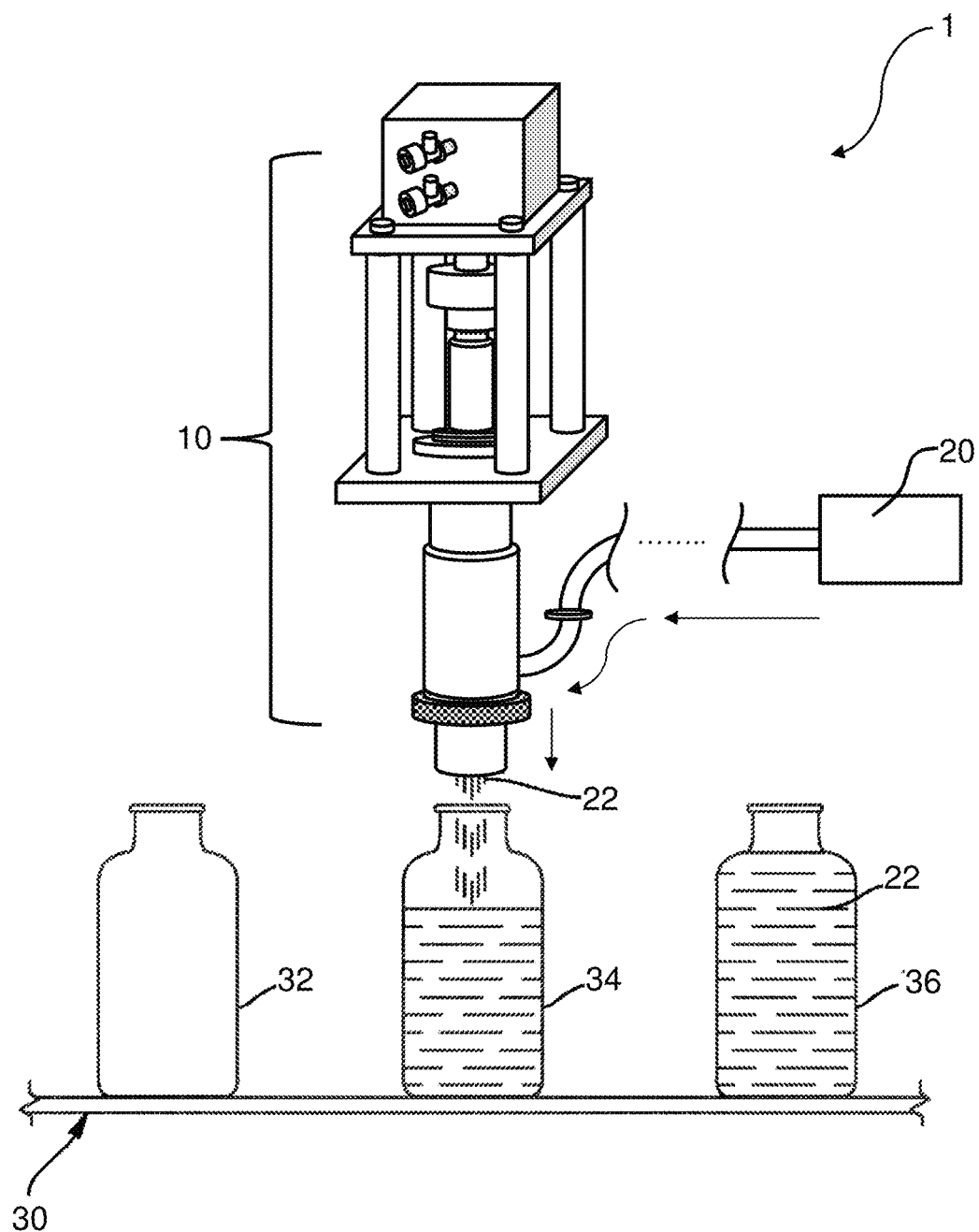
FIG. 1 is a perspective view of a high-speed liquid filling system containing a liquid valve assembly, according to an exemplary embodiment of the present invention.

As used herein, articles such as "a" and "an" when used in a claim, are understood to mean one or more of what is claimed or described. The terms "comprise," "comprises,"

"comprising," "contain," "contains," "containing," "include," "includes" and "including" are all meant to be non-limiting.

As used herein, the term "liquid" refers to a fluid having a liquid having a viscosity of from about 1 to about 2500 mPa·s at 20° C. and a shear rate of 20 sec−$^{1}$. In some embodiments, the viscosity of the liquid may be in the range of from about 10 to about 2000 mPa·s at about 20° C. at a shear rate of about 20 sec−$^{1}$. In some embodiments, the viscosity of the liquid may be in the range of from about 50 to about 1000 mPa·s at about 20° C. at a shear rate of about 20 sec−$^{1}$. The viscosity can be determined using a Brookfield viscometer, No. 2 spindle, at 60 RPM/s.

As used herein, the term "liquid detergent composition" means a liquid composition useful for cleaning soiled materials, and such composition can be in a form selected from the group consisting of pourable liquid, gel, cream, and combinations thereof. The liquid detergent composition may be either aqueous or non-aqueous, and may be anisotropic, isotropic, or combinations thereof.

As used herein, the term "soiled material" is used non-specifically and may refer to any type of flexible material consisting of a network of natural or artificial fibers, including natural, artificial, and synthetic fibers, such as, but not limited to, cotton, linen, wool, polyester, nylon, silk, acrylic, and the like, as well as various blends and combinations. Soiled material may further refer to any type of hard surface, including natural, artificial, or synthetic surfaces, such as, but not limited to, tile, granite, grout, glass, composite, vinyl, hardwood, metal, cooking surfaces, plastic, and the like, as well as blends and combinations.

The term "liquid fabric care composition" herein refers to liquid compositions that are useful for treating fabrics. The liquid fabric care compositions of the present invention may be liquid laundry detergents as well as cleaning auxiliaries such as liquid fabric softeners, liquid bleach additives, or liquid fabric pre-treatment agents.

The following description is intended to provide a general description of the invention along with specific examples to help the reader. The description should not be taken as limiting in any way as other features, combinations of features and embodiments are contemplated by the inventors. Further, embodiments set forth herein are intended to be exemplary of the various features of the invention. As such, it is fully contemplated that features of any of the embodiments described can be combined with or replaced by features of other embodiments, or removed, to provide alternative or additional embodiments within the scope of the invention.

The liquid valve assembly of the present invention may be used in automated, high-speed liquid filling operations, for filling containers with liquid products, especially pressurized liquid products. Suitable containers that can be filled by using such liquid valve assembly of the present invention include, but are not limited to: bottles, cans, jars, pouches, boxes, cups, vials, single unit dose containers such as, for example soluble unit dose pods, pouches, bags, etc., and that the speed of the filling line should not be considered limiting. The liquid products filled by the liquid valve assembly of the present invention can be any liquid compositions, such as beverages, detergents, skin care compositions (e.g., foundations, toners, moisturizers, and the like), and hair care compositions (e.g., shampoos, conditioners, and the like). Preferably but not necessarily, the liquid product being filled by the liquid valve assembly of the present invention is a liquid fabric care composition.

Further, without being bound by theory, it is believed that the splashing in conventional filling lines is created by one or more factors, including, for example, the sudden increase or reduction in the cross-sectional area of the liquid flow path as the liquid shutoff valve opens and closes and/or the pattern of acceleration or deceleration of the liquid flow rate at the beginning and end of the filling cycle. By controlling the speed as well as the pattern of acceleration or deceleration of the liquid flow rate at the beginning and end of the filling cycle, the present invention effectively reduces the amount or intensity of the splash-back. Correspondingly, filling can be done at higher speeds and/or with higher accuracy, which in turn result in better hygiene with less wasted product and/or packaging.

FIG. 1 is a perspective view of a high-speed liquid filling system 1 that can be used in manufacturing line for making packaged liquid products. Such liquid filling system 1 includes a liquid valve assembly 10 that is in fluid communication with a liquid source 20. Multiple containers, such as, for example, bottles 32, 34, and 36, are provided and placed adjacent the liquid valve assembly 10. As shown in the figure, the liquid valve assembly 10 has already filled bottle 36 and is filling bottle 34 with a liquid 22. The liquid 22 flows from the liquid source 20 through the liquid valve assembly 10 into the bottles 32, 34, and 36, as shown by the arrowheads in FIG. 1. Preferably, the liquid 22 is pressurized either at the source 20 or at a specific point along its flow path (not shown) before it enters the liquid valve assembly 10, and more preferably the liquid 22 enters the liquid valve assembly 10 through a sidewall pipe, as shown in FIG. 1. The bottles 32, 34, and 36 may be provided by means of a conveyor belt, such as conveyor belt 30 or any other means suitable for supplying the containers.

The high-speed liquid filling system 1 described herein is intended to be a merely example of various filling operations containing a liquid valve assembly of the present invention and is not intended to be limiting in any way. It is fully contemplated that other filling operations containing liquid valve assemblies of the present invention could be readily used, including but not limited to operations where more than one container is filled at one time, where containers other than bottles are filled, where different shape and/or size containers are filled, where containers are filled in different orientations than shown in the figure, where different filling levels are chosen and/or varied among containers, and where additional steps take place during the filling operation, such as, for example capping, washing, labeling, weighing, mixing, carbonating, heating, cooling, and/or radiating, and the like.

Figure 2:
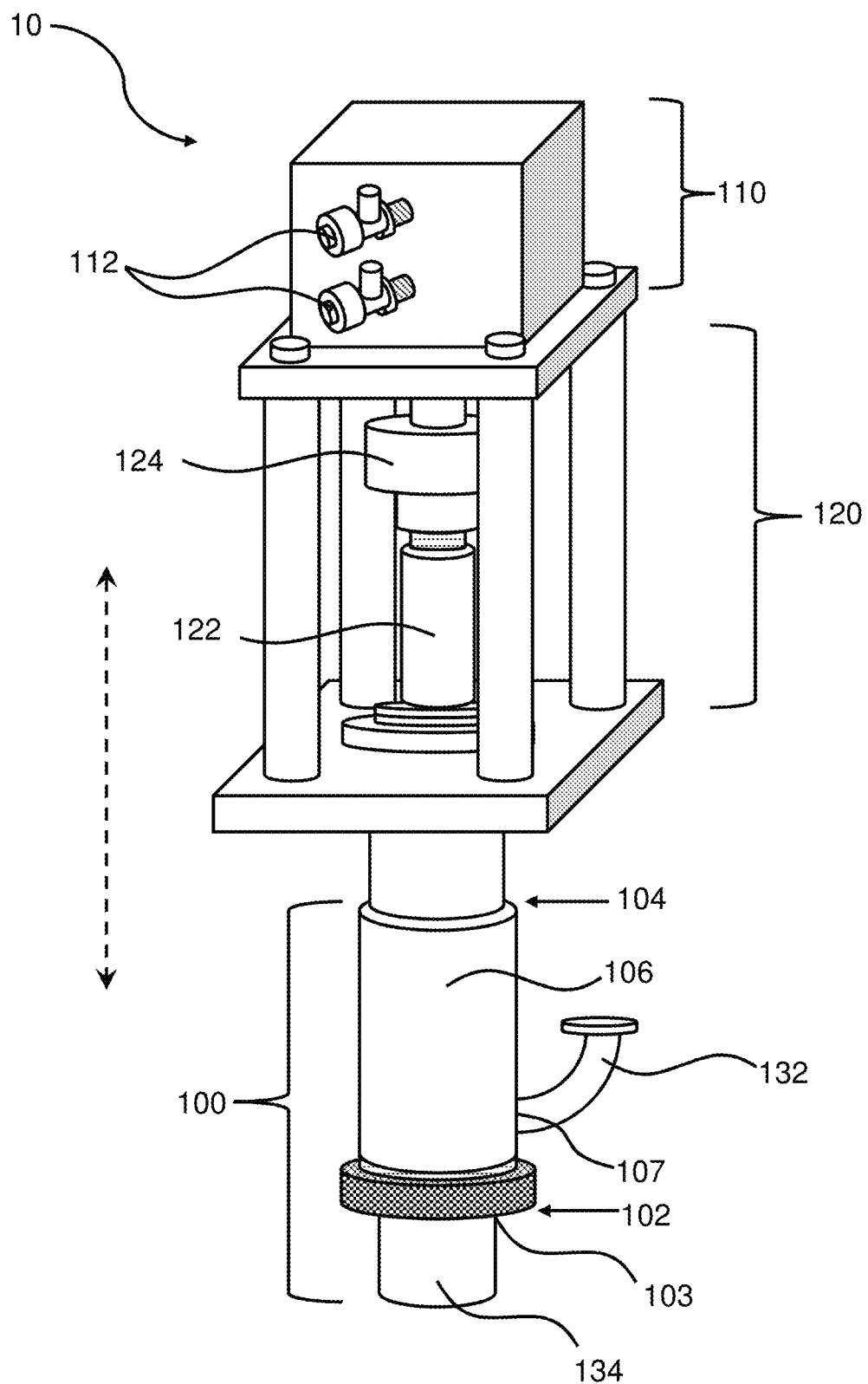
FIG. 2 is a perspective view of the liquid valve assembly of FIG. 1, which contains a liquid chamber with a liquid inlet orifice and a liquid outlet orifice.

FIG. 2 is a perspective view of the liquid valve assembly 10 of FIG. 1. Specifically, the liquid valve assembly 10 includes a liquid chamber 100 having a first end 102, a second end 104 that is opposite to said first end 102, and a side wall 106 that extends between the first and second ends 102 and 104. Preferably but not necessarily, the first end 102 is at the bottom, and the second end 104 is at the top. The liquid chamber 100 can have any desirable shape or contour, as long as it is suitable to accommodate a piston valve therein. For example, the liquid chamber 100 may have a rectangular shape for accommodating a rectangular piston valve therein. For another and preferred example, the liquid chamber 100 may have a cylindrical shape for accommodating a cylindrical piston valve therein. A liquid inlet orifice 107 is located on the sidewall 106 of the liquid chamber 100 and is in fluid communication with the liquid source 20 of FIG. 1 through a sidewall pipe 132. A liquid outlet orifice 103 is located at the first end 102 of the liquid chamber 100 and is in fluid communication with the to-be-filled container 34 of FIG. 1 through a liquid filling nozzle 134. The liquid chamber 100 further contains a piston valve (not shown) that is disposed therein, while the piston valve (not shown) may be movable by a piston rod 122 that extends through the second end 104 of the liquid chamber 100. Preferably, the piston valve (not shown) is movable by the piston rod 122 along a direction that is parallel to the sidewall 106 of the liquid chamber 100, as indicated by the arrowheads with a dashed line in FIG. 2. The piston rod 122 is preferably connected to an actuating cylinder 110 via a joint 124. The actuating cylinder 110 can be either an air cylinder or an electrical cylinder. The actuating cylinder 110 may contain one or more controller valves 112 (although two controller valves are shown in FIG. 2, the actual number thereof is not so limited) that can be opened and closed to actuate the piston rod 122. In one embodiment, the actuating cylinder 110 is an air cylinder, while the controller valves 112 function to allow compressed air into or to release compressed air out of the air cylinder 110, thereby pulling the piston rod 122 upward or to push the piston rod 122 downward, which in turn functions to open and close the piston valve (not shown) inside the liquid chamber 100. In another embodiment, the actuating cylinder 110 can be an electrical cylinder, while the controller valves 112 can be partially opened or closed to place the piston rod 122 at any desired location, thereby partially opening and or closing the piston valve (not shown) inside the liquid chamber 100. It is particularly desirable to provide a cylinder 110 with digitally adjustable controller valves 112 that can enable any desired movement of the piston rod 122 at any desired speed (either constant or variable).

Figure 3A:
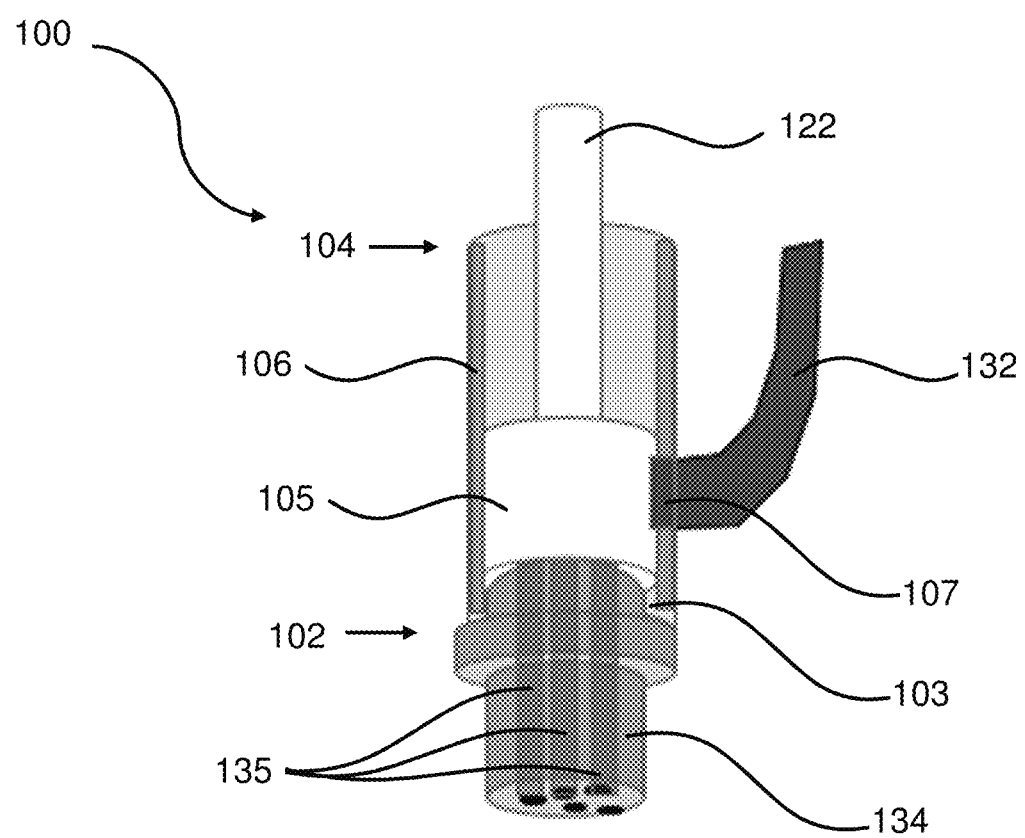
FIG. 3A is a first illustrative sectional view of the liquid chamber of FIG. 2, showing a piston valve disposed inside said liquid chamber at a first position where it blocks both the liquid outlet orifice and the liquid inlet orifice of the liquid chamber.

FIG. 3A is a first illustrative sectional view of the liquid chamber 100 of FIG. 2, showing a piston valve 105 that is disposed inside the liquid chamber 100 and is movable by the piston rod 122 that extends through the second end 104 of the liquid chamber 100. The piston valve 105 as illustrated by FIG. 3A is rested at a first location where it blocks both the liquid outlet orifice 103 at the first end 102 of the liquid chamber 100 and the liquid inlet orifice 107 on the sidewall 106 of the liquid chamber 100. The piston valve 105 is specifically designed and shaped to have a sealed contact with the interior surface of the liquid chamber 100, and preferably it is capable of completely seal off the liquid outlet orifice 103 and the liquid inlet orifice 107 at this first location, not allowing any liquid to flow in or out of the liquid chamber 100. Preferably, the liquid chamber 100 and the piston valve 105 both have a cylindrical shape, and the piston valve 105 can slide inside the liquid chamber 100 along a direction that is parallel to the cylindrical sidewall 106 of the liquid chamber 100. Further, it is preferred that when at this first location, the piston valve 105 blocks or seals the liquid outlet orifice 103 with its bottom surface, and it simultaneously blocks or seals the liquid inlet orifice 107 with a side surface, as illustrated by FIG. 3A.

Preferably, a liquid filling nozzle 134 is connected with and attached to the liquid outlet orifice 103, while such liquid filling nozzle 134 may contain multiple liquid discharging bores or channels 135, as shown in FIG. 3A. Such liquid discharging bores 135 are particularly designed for filling containers with pressurized liquid. The liquid filling nozzle 134 may have a diameter ranging from about 5 mm to about 120 mm, preferably from about 30 mm to about 45 mm. The tip of such nozzle 134 may have: (1) an outer diameter ranging from about 5 mm to about 120 mm, preferably from about 30 mm to about 45 mm; (2) a height ranging from about 1 mm to about 50 mm, preferably from about 3 mm to about 15 mm; and (3) a depth ranging from about 20 mm to about 80 mm, preferably from about 40 mm to about 60 mm. The liquid filling nozzle 134 may contain one, two, three, six, twelve, or forty liquid discharge bores 135, each of which having a diameter ranging from about 1 mm to about 7 mm, preferably from about 2 mm to about 4 mm.

Figure 3B:
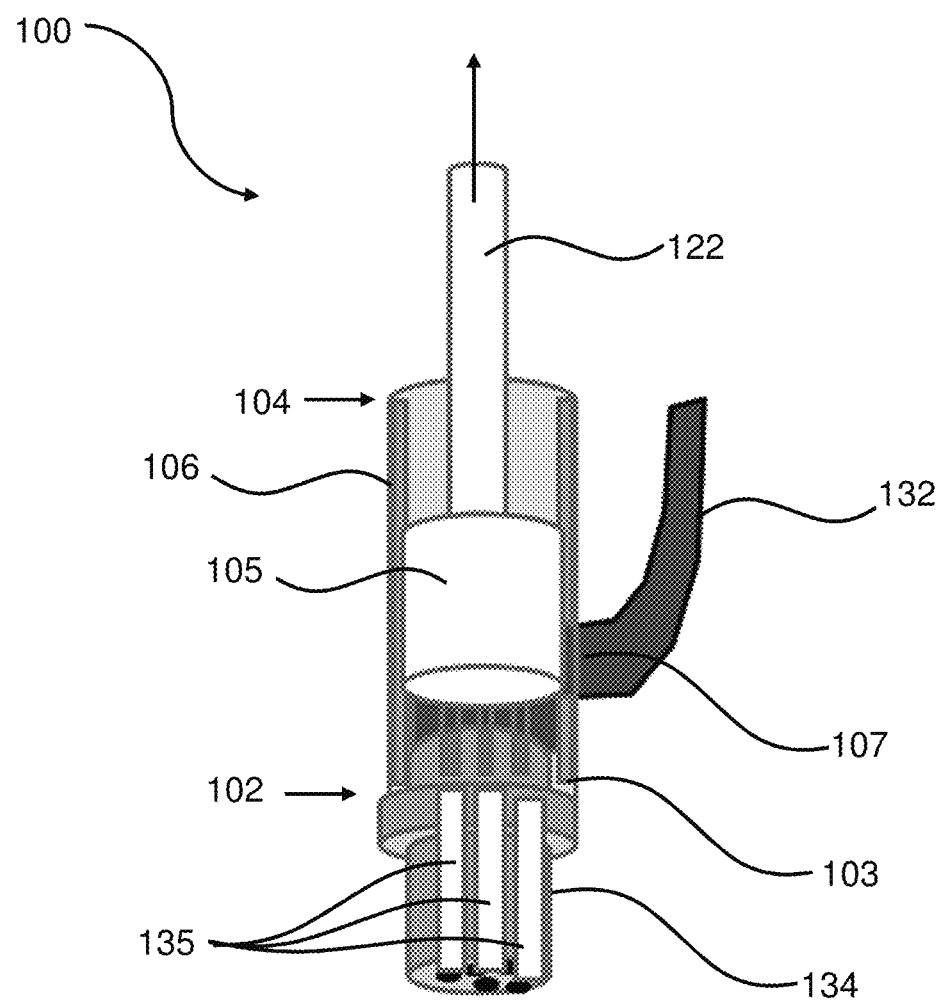
FIG. 3B is a second illustrative sectional view of the liquid chamber of FIG. 2, showing the piston valve moved to a second position where it does not block the liquid outlet orifice but blocks the liquid inlet orifice of the liquid chamber.

FIG. 3B is a second illustrative sectional view of the liquid chamber 100 of FIG. 2, while the piston valve 105 has been moved by the piston rod 122 along a direction indicated by the solid arrowhead (preferably upward) to a second position where it no longer blocks the liquid outlet orifice 103 at the first end 102 but it still blocks or seals the liquid inlet orifice 107 at the sidewall 106 of the liquid chamber 100. Because the piston valve 105 is specifically designed and shaped to have a sealed contact with the interior surface of the liquid chamber 100, its movement from the first position in FIG. 3A to the second position in FIG. 3B creates a vacuum inside the liquid chamber 100 near the liquid outlet orifice 103. Such a vacuum is particularly advantageous for the present invention, because it functions to suck residue liquid slightly back into the liquid filling nozzle 134 but not all the way up (as indicated by the shading of the liquid discharging bores 135), thereby preventing dripping of such residue liquid from the liquid nozzle 134 while at the same time without admitting air into the liquid chamber 100.

Figure 3C:
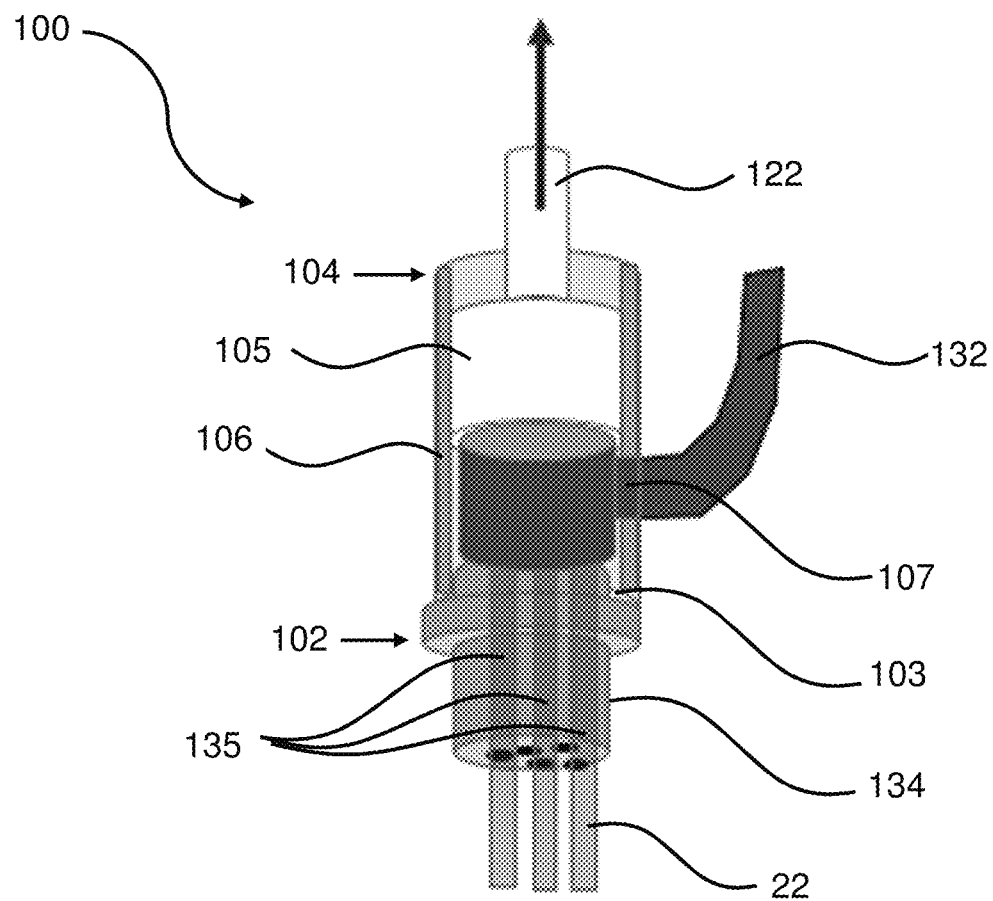
FIG. 3C is a third illustrative sectional view of the liquid valve assembly of FIG. 2, showing the piston valve moved to a third position where it does not block either the liquid outlet orifice or the liquid inlet orifice of the liquid chamber.

FIG. 3C is a third illustrative view of the liquid valve assembly 100 of FIG. 2, while the piston valve 105 has been moved further up by the piston rod 122 to a third position where it no longer blocks either the liquid outlet orifice 103 at the first end 102 or the liquid inlet orifice 107 at the sidewall 106 of the liquid chamber 100. Consequently, liquid 22 flows unobstructed from the sidewall pipe 132 through the liquid inlet orifice 107 into the liquid chamber 100, and then out of such liquid chamber 100 through the liquid outlet orifice 103 into the liquid discharging bores 135 of the liquid filling nozzle 134.

The order of movements of the piston valve 105 from the first position illustrated in FIG. 3A to the second position illustrated in FIG. 3B and then to the third position illustrated in FIG. 3C typically occurs at the beginning of a filling cycle, to turn the liquid valve assembly 100 from a closed state to an open state. In contrast, at the end of the filling cycle, such order of movements is reserved, i.e., the piston valve 105 then moves from the third position illustrated in FIG. 3C to the second position illustrated in FIG. 3B and then back to the first position illustrated in FIG. 3A, thereby turning the liquid valve assembly 100 from an open state to a closed state. During such reversed movements, a small volume of extra liquid may be pushed out of the liquid valve assembly 100 when the piston valve moves from the second position illustrated in FIG. 3B back to the first position illustrated in FIG. 3A after the liquid inlet orifice 107 is already blocked or closed by the piston valve 105.

It is desirable to optimize this volume of extra liquid based on the total height of the liquid chamber 100 and rheology of the liquid products being filled, so as to reduce splashing and dripping of the liquid products. Because the distance between the bottom edge of the liquid inlet orifice 107 and the top edge of the liquid outlet orifice 103 in turn defines the volume of liquid that will be sucked into the liquid chamber 100 at the beginning of a filling cycle (which in turn affects the strength of the vacuum) and the volume of liquid that will be pushed out of the liquid chamber 100 at the end of the filling cycle (which in turn affects dripping or filling volume variation).

Therefore, it is desirable to adjust the distance between the liquid inlet orifice 107 and the liquid outlet orifice 103 to a range of, e.g., from 1 mm to 1 m, preferably from 2 mm to 50 mm, more preferably from 4 mm to 20 mm, depending on the total height of the liquid chamber 100. It is also desirable to adjust the volume of liquid that will be sucked into or pushed out of the liquid chamber 100 at the beginning or end of the filling cycle to a range of, e.g., from 5 mm$^3$ to 100 cm$^3$, preferably from 20 mm$^3$ to 15 cm$^3$.

Preferably, the piston rod 122 moves the piston valve 105 from the second position in FIG. 3B to the third position in FIG. 3C in a gradual manner, thereby gradually unblocking the liquid inlet orifice 107. Such gradual movement of the piston rod 122 and the piston valve 105 can be readily achieved through adjusting the controller valves 112 of the cylinder 110. The gradual unblocking of the liquid orifice 107 is particularly advantageous for the present invention, because it enables better control and modulation of the liquid flow rate through the liquid valve assembly 100 at the beginning of the filling cycle to reduce or eliminate splashing, as explained in greater detail hereinafter.

Figure 3D:
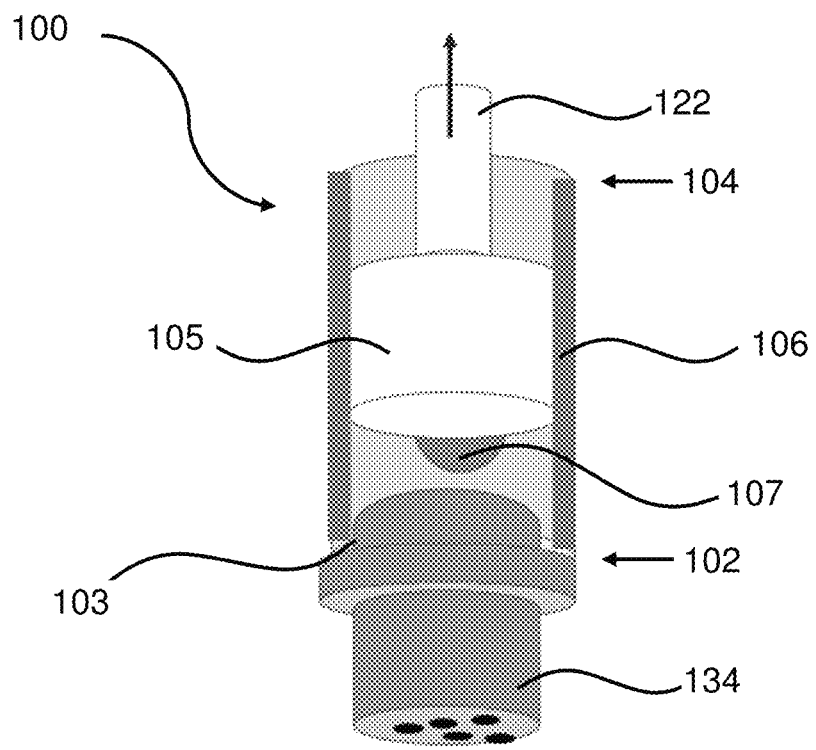
FIG. 3D is a fourth illustrative sectional view of the liquid valve assembly of FIG. 2, showing the piston valve moved to a fourth position where it does not block the liquid outlet orifice but partially blocks the liquid inlet orifice of the liquid chamber.

FIG. 3D is a fourth illustrative view of the liquid valve assembly 100 of FIG. 2, showing the piston valve 105 at a fourth position where it no longer blocks the liquid outlet orifice 103 at the first end 102 and only partially blocks the liquid inlet orifice 107 at the sidewall 106 of the liquid chamber 100. This fourth position is an intermediate, transit position between the second location illustrated by FIG. 3B and the third location illustrated by FIG. 3C. At this point, liquid starts to flow out of the liquid inlet orifice 107, which is not shown herein for the purpose of better illustrating a section of the periphery of the partially blocked liquid inlet orifice 107.

Figure 4:
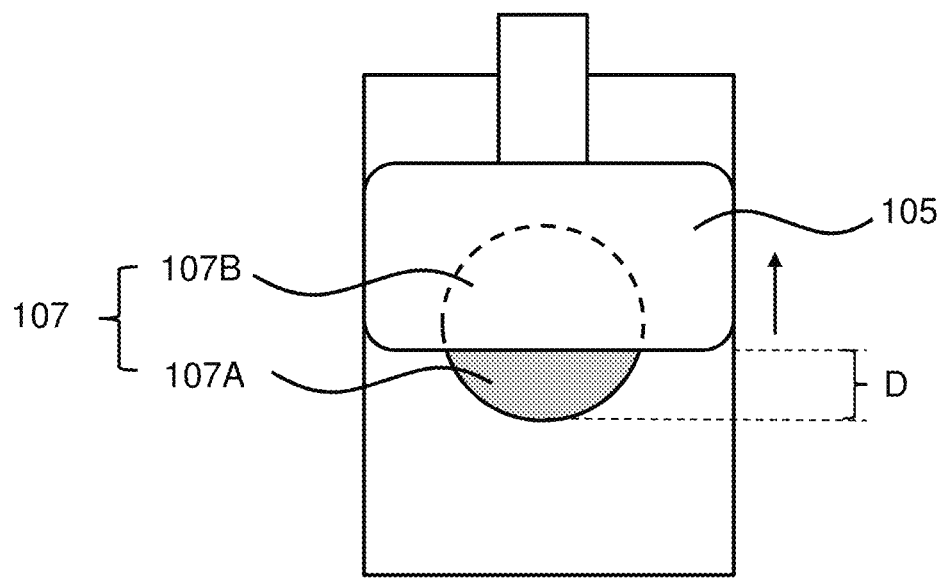
FIG. 4 is a partial cross-sectional view of FIG. 3D, showing the partially blocked liquid inlet orifice with a circular periphery.

FIG. 4 is a partial cross-sectional view of FIG. 3D, showing more in detail the liquid inlet orifice 107, which is partially blocked by the piston valve 105, thereby resulting in an unblocked section 107A (shaded) and a blocked section 107B (unshaded and marked by a dashed line). Liquid can flow through the unblocked section 107A, but not the blocked section 107B. Therefore, at any pre-determined liquid filling rate, the actual liquid flow rate through the liquid inlet orifice 107 when the piston valve 105 is at the fourth location is limited by the area of the unblocked section 107B, which is in turn defined by a function of the distance D traveled by the piston valve 105 when it moves from the second position illustrated by FIG. 3B to the fourth position illustrated by FIG. 3D, as marked by the two dotted lines in FIG. 4.

Preferably, such a function is a non-linear function, because the non-linear function between the piston valve travel distance D and the unblocked area of the liquid inlet orifice 107 will in turn define a non-linear relationship between the piston valve travel distance D and the liquid flow rate through the liquid inlet orifice 107. In this manner, the piston valve 105 can be moved at a constant speed to produce a non-linearly increasing liquid flow rate, without the need for any additional flow rate controlling or modulating means. Such a non-linearly increasing liquid flow rate is particularly useful for reducing splashing the beginning of a filling cycle.

For example, when the liquid inlet orifice 107 has a circular periphery (as shown in FIGS. 3D and 4), which is particularly preferred for the practice of the present invention, the area of the unblocked section 107A of the liquid inlet orifice 107 is defined by Function (I):

$$A = \sqrt{2D*R - D^2} *(D - R) + R^2 * \arccos\left(1 - \frac{D}{R}\right) \quad (I)$$

wherein A is the area of the unblocked section of the liquid inlet orifice 107, wherein D is the distance traveled by the piston valve 105 when it moves from the second position to the fourth position, and wherein R is the radius of the circular liquid inlet orifice 107. More specifically, when the piston valve 105 is moving at a constant speed, i.e., when D is increasing at a constant speed, the area A increases at a variable speed that is significantly slower at the beginning and the end but faster in the middle. This variable increasing speed of area A is translated into a variable increasing liquid flow rate through the liquid inlet orifice 107, and functions to reduce or eliminate splashing at the beginning of the filling cycle.

Figure 5:
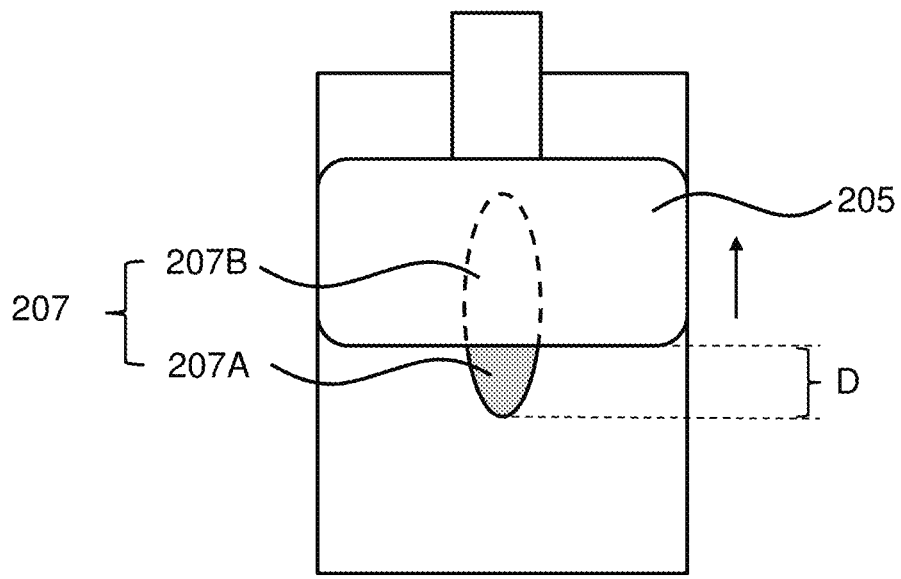
FIG. 5 is a partial cross-sectional view of a liquid valve assembly containing a liquid inlet orifice with an elliptical periphery, according to one exemplary embodiment of the present invention.

Alternatively, the liquid inlet orifice of the present invention may have any other suitable shape to provide such a non-linear shape between the unblocked area A and the piston valve travel distance D. For example, FIG. 5 shows a partial cross-sectional view of another liquid valve assembly with a liquid inlet orifice 207 with an elliptical periphery. The elliptical liquid inlet orifice 207 is partially blocked by a piston valve 205, thereby resulting in an unblocked section 207A (shaded) and a blocked section 207B (unshaded and marked by a dashed line). The area of the unblocked section 207A of the liquid inlet orifice 207 is defined by Function (II):

$$A = \frac{1}{2}*a*b*\left[2*\arccos\left(1 - \frac{D}{b}\right) - \sin\left(2*\arccos\left(1 - \frac{D}{b}\right)\right)\right] \quad (II)$$

wherein A is the area of the unblocked section 207A of the liquid inlet orifice 207, wherein D is the distance traveled by the piston valve 205 when it moves from the second position to the fourth position, wherein a is either the semi major or minor axis of the elliptical liquid inlet orifice 207 that is perpendicular to the travel direction of the piston valve 205, wherein b is the other of the semi major or minor axis of the elliptical liquid inlet orifice 207 that is parallel to the travel direction of the piston valve 205.

Figure 6:
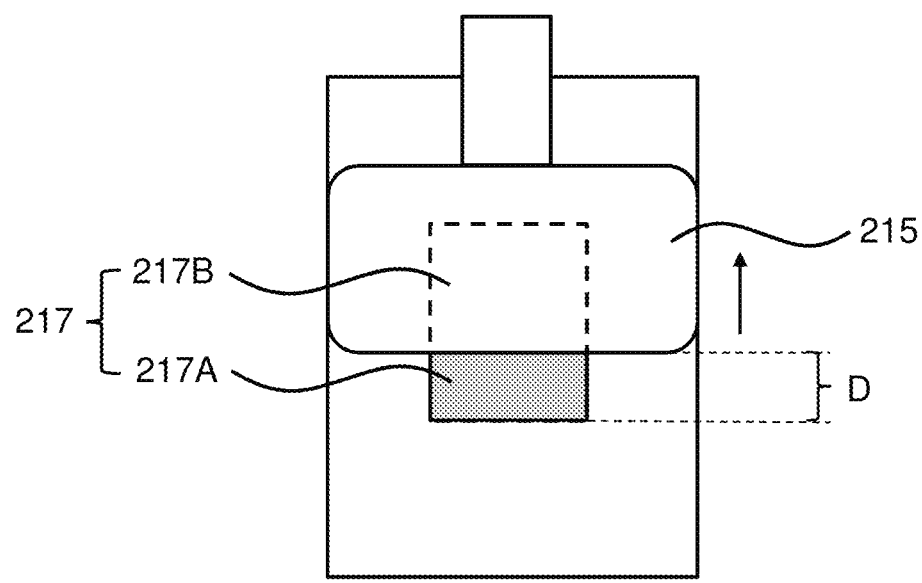
FIG. 6 is a partial cross-sectional view of a liquid valve assembly containing a liquid inlet orifice with a rectangular periphery, according to one exemplary embodiment of the present invention.
Figure 7:
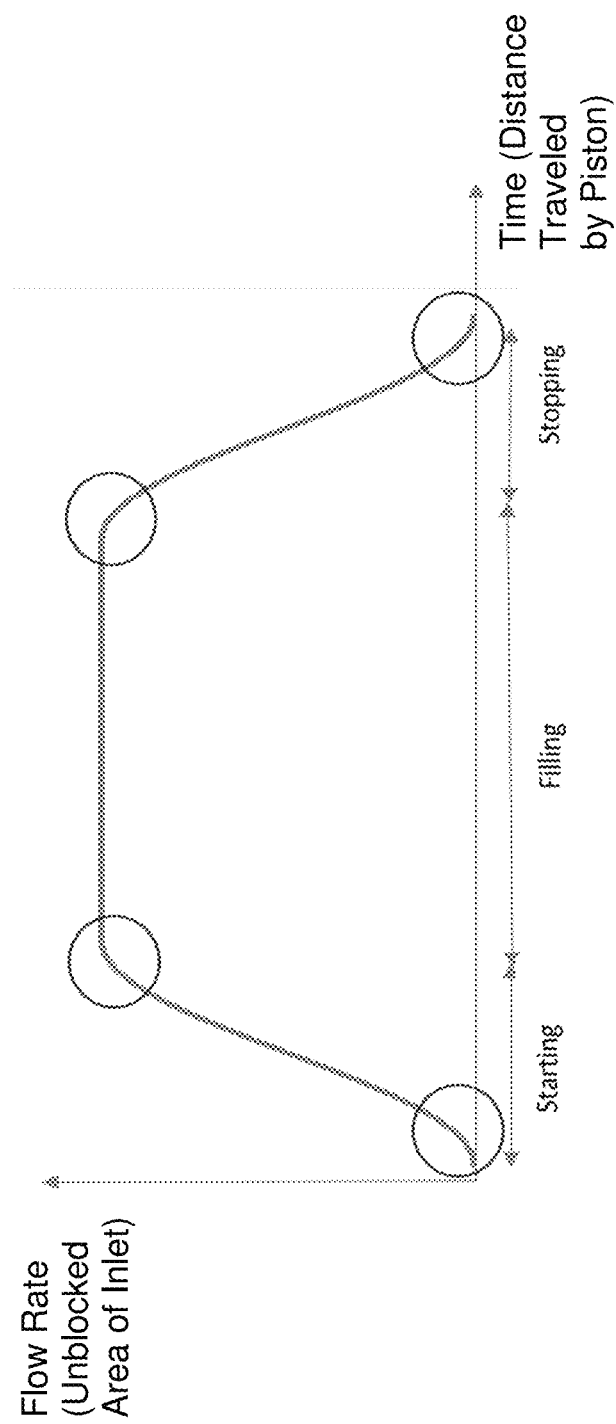
FIG. 7 is a plot illustrating the relationship between the liquid flow rate change over time during a filling cycle, when the liquid valve assembly of FIG. 1 is used.

It is also possible that the liquid inlet orifice of the present invention has a shape that defines a linear shape between the unblocked area A and the piston valve travel distance D. For example, FIG. 6 shows a partial cross-sectional view of yet another liquid valve assembly with a liquid inlet orifice 217 with a rectangular periphery. The rectangular liquid inlet orifice 217 is partially blocked by a piston valve 215, thereby resulting in an unblocked section 217A (shaded) and a blocked section 217B (unshaded and marked by a dashed line). The area of the unblocked section 217A of the liquid inlet orifice 217 is defined by a linear function of the distance D traveled by the piston valve 215 when it moves from the second position to the fourth position. In such an embodiment, it is then preferred that the piston valve 215 is moved at a non-constant speed, so that a non-linearly increasing liquid flow rate can still be provided for reducing splashing the beginning of a filling cycle.

The liquid valve assembly of the present invention preferably provides a filling liquid flow profile with "sin" curves, which is characterized by a non-linear increase of the liquid flow rate at the beginning of a filling cycle and a non-linear decrease of the liquid flow rate at the end of the filling cycle. Specifically, when the filling cycle starts, the liquid flow rate increases at an acceleration rate that is slow at the beginning, which gradually increases to a maximum in the middle, and then decreases to reach a constant liquid flow rate for full capacity liquid filling. Such a variable acceleration rate may correlate with the non-linear area increase of the unblocked section of a circular liquid inlet orifice when the piston valve moves from the second position to the fourth position as mentioned hereinabove.

Similarly, when the filling cycle stops, the liquid flow rate decreases at a deceleration rate that is slow at the beginning, which gradually increases to a maximum in the middle, and then decreases to reach zero liquid flow rate for a complete stop of the filling operation. Such a variable deceleration rate also correlate with the non-linear area decrease of the unblocked section of a circular liquid inlet orifice when the piston valve moves from the fourth position to the second position and then to the first position in reverse direction to shut off the liquid valve assembly of the present invention.

EXAMPLES

Example 1: Comparative Test Showing Reduction of Splashing when Filling a Newton Liquid Using the Side Shutoff Piston Valve of the Present Invention A milky white Newton liquid having a viscosity of about 100 mPa·s measured at 20° C. and a shear rate of 20 sec$^{-1}$ is provided.

This milky white Newton liquid is first filled into a transparent, flexible pouch container with a filling volume of about 1.4 L by using a side shutoff piston valve according to the present invention at 30° C. and under a pressure of about 0.5 bar. No visible splashing is observed at the end of the filling cycle.

This milky white Newton liquid is then filled into a transparent, flexible pouch container by using a non-piston valve, which opens and closes by unblocking and blocking the bottom liquid outlet orifice alone, also at 30° C. and under a pressure of about 0.5 bar. Splashing with a maximum height of 50 mm is observed at the end of the filling cycle.

Example 2: Comparative Test Showing Reduction of Splashing when Filling a Non-Newton Liquid Using the Side Shutoff Piston Valve of the Present Invention A blue non-Newton liquid having a viscosity of about 270 mPa·s measured at 20° C. and a shear rate of 20 sec$^{-1}$ is provided.

This blue non-Newton liquid is first filled into a transparent, flexible pouch container with a filling weight of about 1.35 kg by using a side shutoff piston valve according to the present invention at 30° C. and under a pressure of about 0.8 bar. No visible splashing is observed at the end of the filling cycle.

This blue non-Newton liquid is then filled into a transparent, flexible pouch container by using a non-piston valve, which opens and closes by unblocking and blocking the bottom liquid outlet orifice alone, also at 30° C. and under a pressure of about 0.5 bar. Splashing with a maximum height of 50 mm is observed at the end of the filling cycle.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A liquid valve assembly comprising:
   (a) a liquid chamber having a first end, a second end that is opposite to said first end, and at least one sidewall extending between the first and second ends;
   (b) a liquid inlet orifice located on said at least one sidewall of the liquid chamber, wherein said liquid inlet orifice is in fluid communication with a source of a liquid;
   (c) a liquid outlet orifice located at the first end of the liquid chamber, wherein said liquid outlet orifice is in fluid communication with a container to be filled with the liquid;
   (d) a piston valve disposed inside the liquid chamber, wherein said piston valve is movable between a first position, a second position and a third position, wherein at the first position said piston valve blocks both the liquid outlet orifice and the liquid inlet orifice, wherein at the second position said piston valve does not block the liquid outlet orifice but blocks the liquid inlet orifice, and wherein at the third position said piston valve does not block either the liquid outlet orifice or the liquid inlet orifice; and
   (e) a liquid filling nozzle that is attached to the liquid outlet orifice for filling the container with liquid flowing out of the liquid chamber, the liquid filling nozzle comprising a plurality of liquid discharging bores;
   wherein when said piston moves from the first position to the second position, a vacuum is created inside said liquid chamber near the liquid outlet orifice.

2. The liquid valve assembly of claim 1, wherein said piston valve is movable along a direction parallel to said at least one sidewall of the liquid chamber.

3. The liquid valve assembly according to claim 1, wherein when said piston valve moves from the second position to the third position, the liquid inlet orifice is gradually unblocked.

4. The liquid valve assembly according claim 1, wherein the piston valve is further movable to a fourth position, wherein at said fourth position the piston valve does not block the liquid outlet orifice but partially blocks the liquid inlet orifice, thereby defining an unblocked section and a blocked section of the liquid inlet orifice.

5. The liquid valve assembly of claim 4, wherein the unblocked section of the liquid inlet orifice has an area defined by a non-linear function of the distance traveled by said piston valve when it moves from the second position to the fourth position.

6. The liquid valve assembly of claim 5, wherein the liquid inlet orifice has a circular periphery, and wherein the area of the unblocked section of the liquid inlet orifice is defined by Function (I):

$$A = \sqrt{2D*R - D^2} *(D-R) + R^2 * \arccos\left(1 - \frac{D}{R}\right) \quad (I)$$

wherein A is the area of the unblocked section of the liquid inlet orifice, wherein D is the distance traveled by the piston valve when it moves from the second position to the fourth position, and wherein R is the radius of the circular liquid inlet orifice.

7. The liquid valve assembly of claim 5, wherein the liquid inlet orifice has an elliptical periphery, and wherein the area of the unblocked section of the liquid inlet orifice is defined by Function (II):

$$A = \frac{1}{2} *a*b* \left[2*\arccos\left(1 - \frac{D}{b}\right) - \sin\left(2*\arccos\left(1 - \frac{D}{b}\right)\right)\right] \quad (II)$$

wherein A is the area of the unblocked section of the liquid inlet orifice, wherein D is the distance traveled by the piston valve when it moves from the second position to the fourth position, wherein a is either the semi major or minor axis of the elliptical liquid inlet orifice that is perpendicular to the travel direction of the piston valve, and wherein b is the other of the semi major or minor axis of the elliptical liquid inlet orifice that is parallel to the travel direction of the piston valve.

8. The liquid valve assembly according to claim 1, wherein said liquid chamber has a cylindrical shape.

9. The liquid valve assembly according to claim 1, wherein the liquid inlet orifice is spaced apart from the liquid outlet orifice by a distance ranging from 1 mm to 1 m.

10. The liquid valve assembly according to claim 1, wherein the liquid from the source is pressurized before it enters the liquid inlet orifice.

* * * * *